United States Patent
Gronvall (10) Patent No.: US 10,838,163 B2
(45) Date of Patent: Nov. 17, 2020

(54) FIBER OPTIC CABLE SPOOL

(71) Applicant: CommScope Technologies LLC, Hickory, NC (US)

(72) Inventor: Erik J. Gronvall, Bloomington, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/694,309

(22) Filed: Nov. 25, 2019

(65) Prior Publication Data

US 2020/0166723 A1 May 28, 2020

Related U.S. Application Data

(63) Continuation of application No. 15/274,923, filed on Sep. 23, 2016, now Pat. No. 10,495,835.

(60) Provisional application No. 62/233,673, filed on Sep. 28, 2015.

(51) Int. Cl.
  *G02B 6/44* (2006.01)
  *G02B 6/38* (2006.01)

(52) U.S. Cl.
  CPC ......... *G02B 6/4457* (2013.01); *G02B 6/3897* (2013.01)

(58) Field of Classification Search
  CPC .............................. G02B 6/4457; G02B 6/3897
  See application file for complete search history.

(56) References Cited

U.S. PATENT DOCUMENTS

| | | | |
|---|---|---|---|
| 4,989,582 A * | 2/1991 | Sakiyama | A61B 1/042 348/65 |
| 6,151,144 A * | 11/2000 | Knox | G02B 6/29368 348/E7.061 |
| 7,400,814 B1 | 7/2008 | Hendrickson et al. | |
| 7,546,018 B2 | 6/2009 | Hendrickson et al. | |
| 7,715,679 B2 | 5/2010 | Kowalczyk et al. | |
| 7,748,660 B2 | 7/2010 | Hendrickson et al. | |
| 7,756,379 B2 | 7/2010 | Kowalczyk et al. | |
| 7,869,682 B2 | 1/2011 | Kowalczyk et al. | |
| 8,238,707 B2 * | 8/2012 | Smrha | B65H 75/14 385/135 |
| 8,254,740 B2 * | 8/2012 | Smith | H04B 10/275 385/135 |
| 8,422,847 B2 | 4/2013 | Kowalczyk et al. | |
| 9,036,974 B2 | 5/2015 | LeBlanc et al. | |
| 9,097,870 B2 | 8/2015 | Torman et al. | |
| 9,581,780 B2 | 2/2017 | Kowalczyk et al. | |
| 9,684,142 B2 | 6/2017 | Collart et al. | |
| 9,703,063 B2 * | 7/2017 | Van Baelen | G02B 6/46 |

(Continued)

FOREIGN PATENT DOCUMENTS

EP  0 509 384 A2  10/1992

*Primary Examiner* — Chris H Chu
(74) *Attorney, Agent, or Firm* — Merchant & Gould P.C.

(57) ABSTRACT

Installing an optical cable at an installation location includes routing a second end of the optical cable towards the installation location; wrapping the second end of the optical cable around a portion of a cable spool at the installation location; attaching the second end of the optical cable to a connector holder disposed at the cable spool; and turning a crank arm to wind the cable spool, thereby winding slack length of the optical cable around the drum. Some types of crank arms are removable from the cable spool. Other types of crank arms are collapsible relative to the cable spool.

20 Claims, 5 Drawing Sheets

(56) References Cited

U.S. PATENT DOCUMENTS

| | | | |
|---|---|---|---|
| 10,495,835 B2 | 12/2019 | Gronvall | |
| 2006/0045458 A1* | 3/2006 | Sasaki | G02B 6/444 385/135 |
| 2007/0031101 A1* | 2/2007 | Kline | G02B 6/4457 385/135 |
| 2008/0131057 A1* | 6/2008 | McGranahan | G02B 6/444 385/75 |
| 2009/0230228 A1* | 9/2009 | Penumatcha | G02B 6/4457 242/395 |
| 2015/0093088 A1* | 4/2015 | Matz | G02B 6/4446 385/135 |
| 2015/0286023 A1* | 10/2015 | Van Baelen | G02B 6/4466 385/135 |
| 2016/0299307 A1 | 10/2016 | Krampotich et al. | |

* cited by examiner

FIBER OPTIC CABLE SPOOL

CROSS REFERENCE TO RELATED APPLICATIONS

This application is a continuation of application Ser. No. 15/274,923, filed Sep. 23, 2016, now U.S. Pat. No. 10,495,835, which application claims the benefit of provisional application Ser. No. 62/233,673, filed Sep. 28, 2015, which applications are incorporated herein by reference in their entirety.

BACKGROUND

Passive optical networks are becoming prevalent in part because service providers want to deliver high bandwidth communication capabilities to customers.

Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

Figure 1:
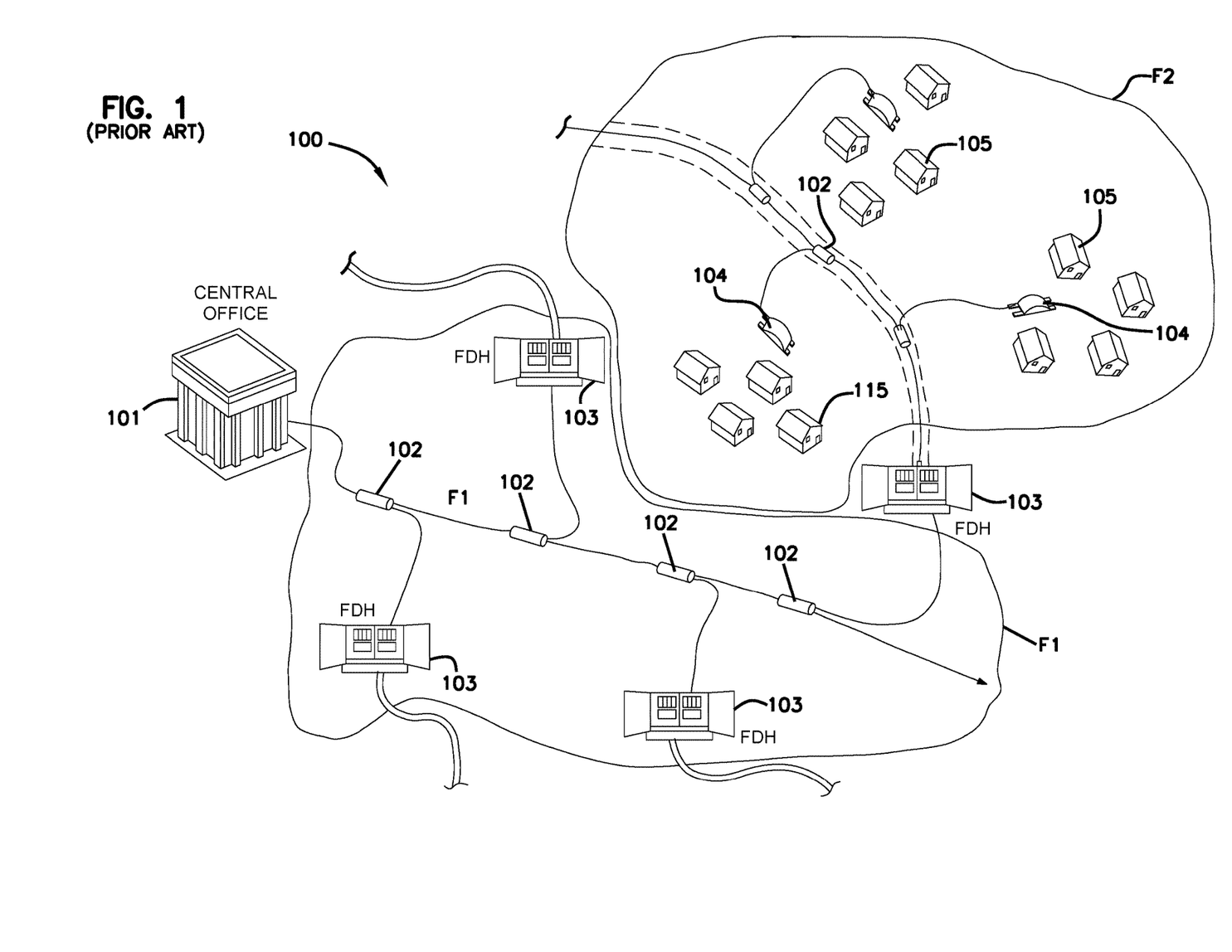
FIG. 1 shows a passive fiber optic network.

FIG. 1 illustrates a network 100 deploying passive fiber optic lines. As shown, the network 100 can include a central office 101 that connects a number of end subscribers 105 (also called end users 105 herein) in a network. The central office 101 can additionally connect to a larger network such as the Internet (not shown) and a public switched telephone network (PSTN). The network 100 can also include fiber distribution hubs (FDHs) 103 having one or more optical splitters (e.g., 1-to-8 splitters, 1-to-16 splitters, or 1-to-32 splitters) that generate a number of individual fibers that may lead to the premises of an end user 105. The various lines of the network 100 can be aerial or housed within underground conduits.

The portion of the network 100 that is closest to central office 101 is generally referred to as the F1 region, where F1 is the "feeder fiber" from the central office 101. The portion of the network 100 closest to the end users 105 can be referred to as an F2 portion of network 100. The network 100 includes a plurality of break-out locations 102 at which branch cables are separated out from the main cable lines. Branch cables are often connected to drop terminals 104 that include connector interfaces for facilitating coupling of the fibers of the branch cables to a plurality of different subscriber locations 105.

SUMMARY

Some aspects of the disclosure are directed to a method of installing an optical cable at an installation location. The method includes routing a second end of the optical cable towards the installation location; wrapping the second end of the optical cable around a portion of a cable spool at the installation location; attaching the second end of the optical cable to a connector holder disposed at the cable spool; and turning a crank arm to wind the cable spool, thereby winding slack length of the optical cable around the drum.

In certain implementations, the cable spool includes a drum extending axially outwardly from a mounting plate and a first flange extending radially outwardly from the drum at an opposite end of the drum from the mounting plate. The first flange has a first surface facing towards the mounting plate and a second surface facing away from the mounting plate.

In certain implementations, the connector holder is disposed at the second surface of the first flange In certain implementations, the method also includes wrapping the second end of the optical cable about a notch defined in a first flange of the cable spool so that the second end is disposed at an opposite side of the first flange from the drum.

In certain implementations, the optical cable has a first end coupled to a network location.

In some implementations, the method includes attaching the crank arm to the cable spool. In certain implementations, the method also includes detaching the crank arm from the mounting panel prior to attaching the crank arm to the cable spool. In certain examples, attaching the crank arm to the cable spool includes attaching the crank arm to the drum. In certain examples, attaching the crank arm to the cable spool includes attaching the crank arm to the first flange.

In other implementations, the method includes moving the crank arm from a collapsed position to an access position prior to turning the crank arm, wherein moving the crank arm does not include detaching the crank arm from the cable spool. In certain implementations, moving the crank arm includes pivoting the crank arm relative to the cable spool.

In certain implementations, the connector holder includes an optical adapter having a first port and an oppositely disposed second port. Attaching the second end of the optical cable to the connector holder includes plugging the second end of the optical cable into the first port.

In certain examples, the method also includes plugging a connectorized end of a patch cable into the second port; and routing another end of the patch cable to a subscriber interface device.

In certain examples, the method also includes unplugging the second end of the optical cable from the first port; unwinding a length of the second end of the optical cable from the cable spool; and plugging the second end of the optical cable into the subscriber interface device.

In certain implementations, the method includes attaching a housing over the cable spool and the optical cable after the optical cable has been wound onto the cable spool. The housing defines a port through which the optical cable exits an interior of the housing.

In some examples, the method includes removing the crank arm prior to attaching the housing over the cable spool. In other examples, the method includes collapsing the crank arm prior to attaching the housing over the cable spool.

In certain implementations, the installation location is an exterior of a subscriber premises, the optical cable is a drop cable, and the network location is a drop terminal.

In certain implementations, the installation location is an interior of a subscriber premises and the optical cable includes an optical fiber.

In certain implementations, the method includes locking the cable spool in one rotational position when the slack length of the optical cable has been wound.

In accordance with other aspects of the disclosure, an optical cable slack storage system includes a mounting plate; a cable spool; a connector holder disposed on the cable spool; and a crank arm configured to be coupled to the cable spool. The cable spool extends along an axis of rotation from a first end to a second end. The first end is coupled to the mounting plate. The cable spool is configured to rotate relative to the mounting plate about the axis of rotation. The connector holder is configured to rotate in unison with the cable spool. A user can wind an optical fiber around the cable spool by turning the crank arm.

In some implementations, the crank arm is removable from the cable spool. In certain examples, the mounting plate includes a mounting location configured to hold the crank arm when the crank arm is detached from the cable spool.

In other implementations, the crank arm is movable between a collapsed position and an access position without detaching from the cable spool. In certain examples, the crank arm is pivotable between the collapsed position and the access position.

In certain implementations, the connector holder includes an optical adapter having a first port and an oppositely facing second port.

In certain implementations, the cable spool includes a drum and a flange extending radially outwardly from the drum at the second end of the cable spool. The connector holder is disposed on the flange. In certain examples, the flange defines a notch aligned with the connector holder.

In certain implementations, the connector holder is disposed at the second end of the cable spool.

In certain implementations, a housing that is configured to mount to the mounting plate to cover the cable spool. The housing defines a port through which an optical cable can exit an interior of the housing.

In certain examples, the housing has a depth that fits about the cable spool, but not about the crank arm when the crank arm is attached to the cable spool.

In certain examples, the housing has a depth that fits about the cable spool when the crank arm is collapsed, but not when the crank arm is disposed in the access position.

In certain examples, the housing includes a seal arrangement to provide an environmental seal between the housing and the mounting panel so that the cable spool is sealed within the housing.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The present disclosure is directed to a method of installing an optical cable at an installation location. In particular, the present disclosure is directed to storing excess length of the optical cable at the installation location. A free end of the optical cable is wrapped around an optical cable spool and positioned at a connector holder. A crank arm is moved to an access position and turned by a user to rotate the cable spool, thereby winding the optical cable about the cable spool. In some implementations, the crank arm is attached to the cable spool to wind the optical cable and then removed. In other implementations, the crank arm is movable to a collapsed position after the cable spool is wound.

Figure 2:
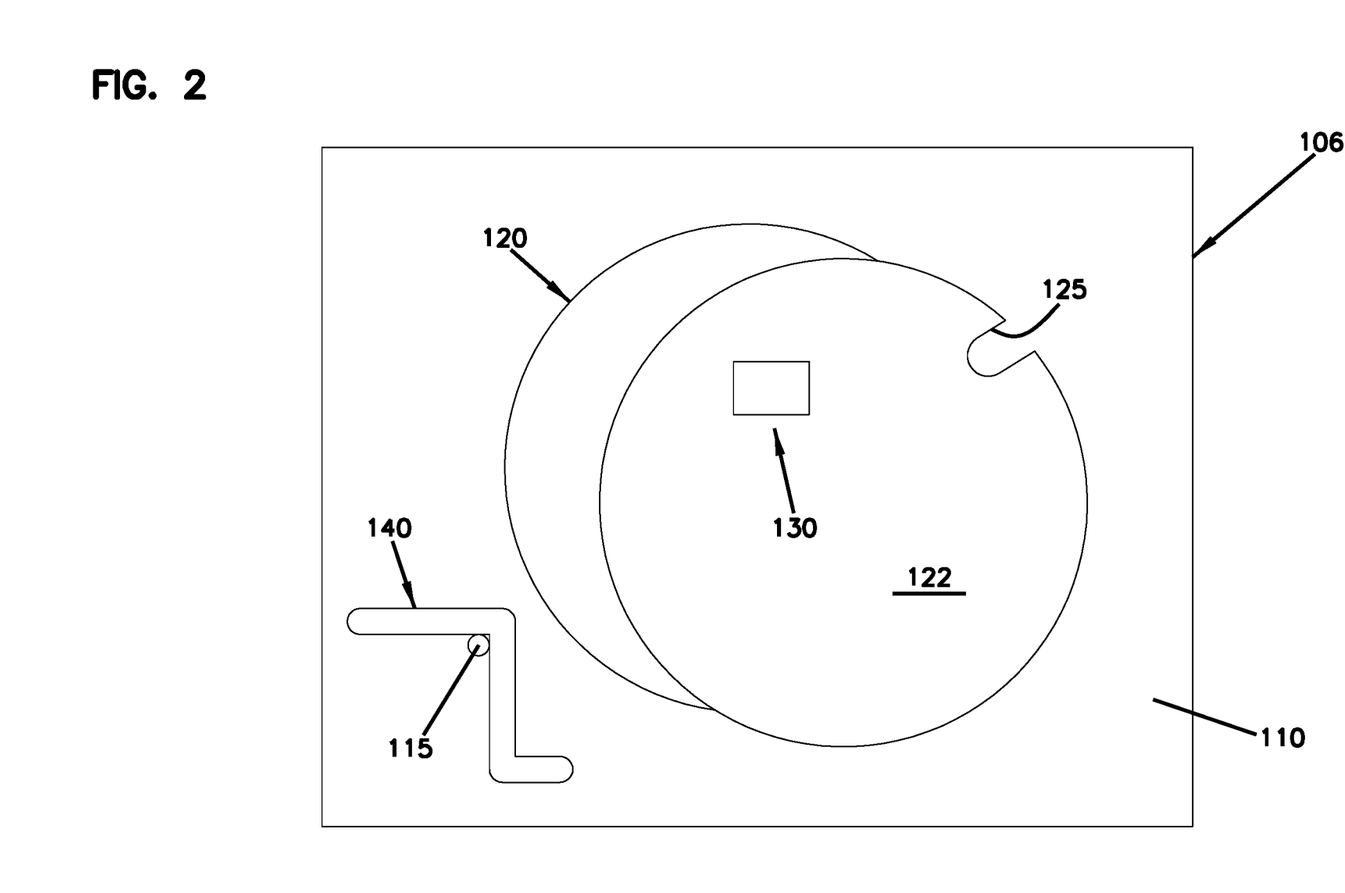
FIG. 2 is a schematic view of an example optical cable slack storage system.

FIG. 2 illustrates an optical cable slack storage system 106 including a mounting plate 110, a cable spool 120, a connector holder 130, and a crank arm 140. The cable spool 120 extends along an axis of rotation $A_R$ (FIG. 3) from a first end to a second end. The cable spool 120 is configured to rotate relative to the mounting plate 110 about the axis of rotation $A_R$. The first end of the cable spool 120 is coupled to the mounting plate 110. The connector holder 130 is disposed on the cable spool 120 and is configured to rotate in unison with the cable spool 120.

A user can wind an optical cable around the cable spool 120 by turning the crank arm 140. In some implementations, the crank arm 140 is detachable from the cable spool 120. In such implementations, a user attaches the crank arm 140 to the cable spool 120 to wind the optical cable about the cable spool 120. In certain implementations, the mounting plate 110 includes a mounting location 115 configured to hold the detached crank arm 140 associated with the cable spool 120. In other implementations, a user can carry the same crank arm 140 between various installation locations and use the crank arm 140 to wind each of the cable spools 120 at the installation sites.

In some implementations, the crank arm 140 has a keyed end that slots into a keyed passageway defined by the cable spool 120 in a particular rotational configuration. Accordingly, rotation of the crank arm 140 yields rotation of the cable spool 120. In other implementations, the crank arm 140 defines the keyed passageway and the cable spool 120 defines a keyed protrusion. In still other implementations, the crank arm 140 otherwise removably attaches to the cable spool 120 so as to cause the cable spool 120 to rotate with the crank arm.

In other implementations, the crank arm 140 is not deattachable from the cable spool 120, but is movable between a collapsed position and an access position. For example, one end of the crank arm 140 may be pivotally attached to the cable spool 120 so that the crank arm 140 can pivot between the collapsed position and the access position. Moving the crank arm 140 to the access position facilitates turning the crank arm 140, which causes the cable spool 120 to rotate. Moving the crank arm 140 to the collapsed position reduces the depth of the optical cable slack storage system 106.

In other implementations, the crank arm 140 can be dettachable from the cable spool 120 and also movable between the collapsed position and the access position.

Figure 3:
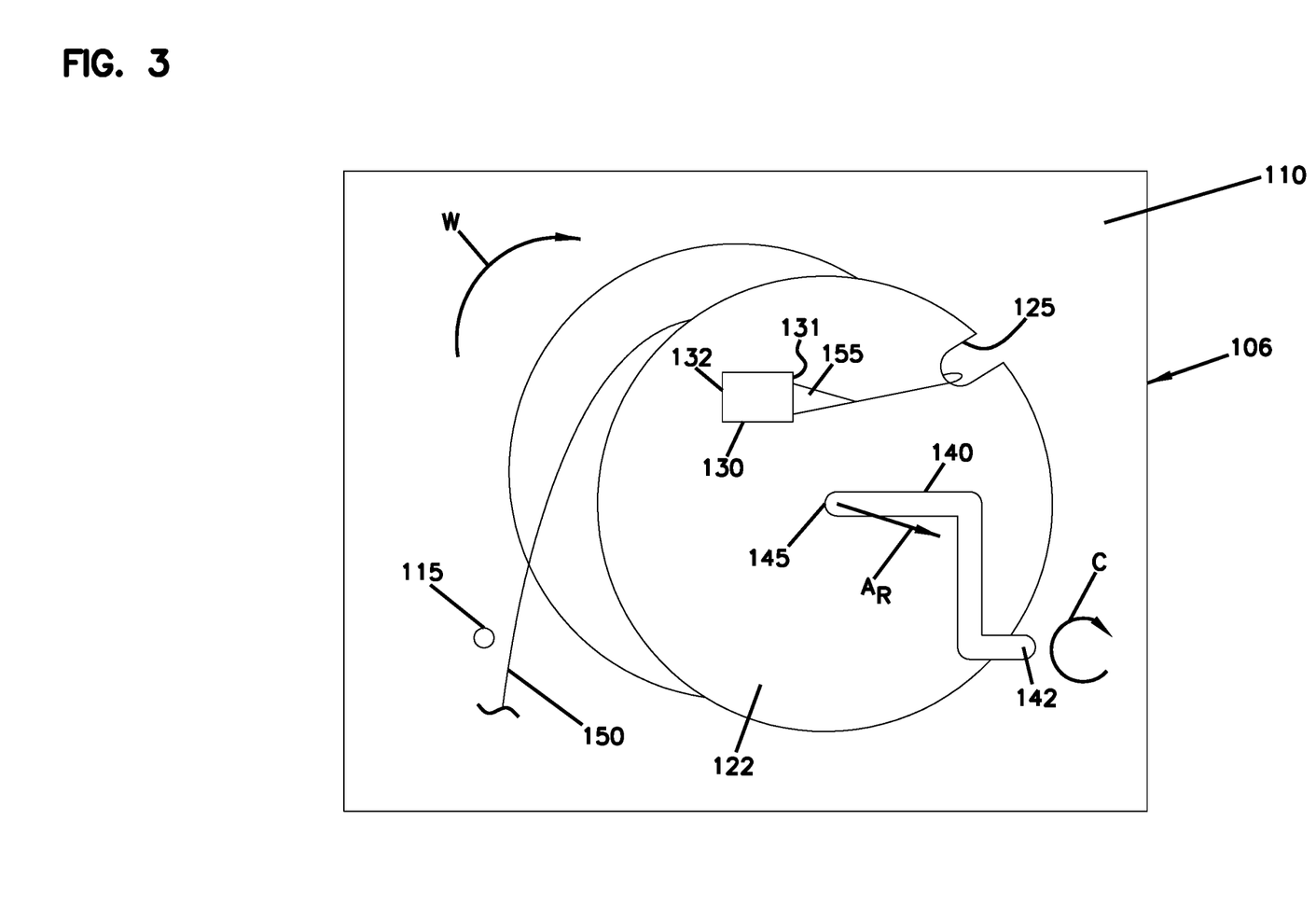
FIG. 3 is a schematic view showing an optical cable being wound on the optical cable slack storage system of FIG. 2.

FIG. 3 illustrates the optical cable slack storage system 106 with the crank arm 140 attached to the cable spool 120 and/or disposed in an access position. A second end of an optical cable 150 has been partially wound around the cable spool 120. A free end 155 of the optical cable 150 has been routed to the connector holder 130 and is held thereat. Accordingly, the free end 155 of the optical cable 150 rotates in unison with the cable spool 120 while any excess length of the optical cable 150 is wound onto the cable spool 120.

In some implementations, the cable spool 120 includes a drum and a flange 122 extending radially outwardly from the drum at the second end of the cable spool 120. In certain implementations, the cable spool 120 also includes a second flange extending radially outwardly from the drum at the first end of the cable spool 120. In some implementations, the connector holder 130 is disposed at the flange 122. In other implementations, the connector holder 130 is disposed at the second flange. In still other implementations, the connector holder 130 is otherwise disposed at the cable spool 120.

In the example shown, the connector holder 130 is disposed at an outwardly-facing surface of the flange 122. In certain examples, the flange 122 defines a notch 125 through which the optical cable 150 can be routed to enable the second end 155 to reach the connector holder 130. In certain implementations, the notch 125 aligns with the connector holder 130. In certain implementations, the notch 125 is sufficiently deep to enable the second end 155 of the optical cable 150 to be contained fully within an outer diameter of the flange 122.

In some implementations, the connector holder 130 includes an optical adapter defining a first port 131 and a second, oppositely-facing port 132. In certain examples, the first port 131 aligns with the notch 125 in the flange 122. In some examples, the optical adapter 130 is configured to receive single-fiber optical connectors (e.g., LC connectors, SC connectors, LX.5 connectors, etc.). In other examples, the optical adapter 130 is configured to receive multi-fiber optical connectors (e.g., MPO connectors, etc.). In still other implementations, the connector holder 130 includes latch fingers configured to snap over the second end 155 of the optical cable 150.

As shown in FIG. 3, the crank arm 140 is configured to be turned in a direction C. For example, the crank arm 140 can include a handle 142 that a user grasps to turn the crank arm 140. Turning the crank arm 140 in the direction C causes the cable spool 120 to rotate in the direction W. Rotating the cable spool 120 in the direction W causes the optical cable 150 to wind about the drum of the cable spool 120 while the second end 155 of the optical cable 150 is held at the connector holder 130. In certain implementations, the cable spool 120 can be rotationally locked relative to the mounting panel when the excess length of the cable spool has been wound.

In some implementations, the crank arm 140 can be detached from the cable spool 120 when the excess length of the optical cable 150 has been wound. Accordingly, the excess length is stored on the cable spool 120. In certain examples, the crank arm 140 can be stored on the mounting panel 110 at the mounting location 115.

In other implementations, the crank arm 140 can be moved relative to the cable spool 120 to the collapsed position. When in the collapsed position, the crank arm 140 remains attached to the cable spool 120, but the depth of the overall system 106 is reduced. For example, the crank arm 140 may couple to the cable spool 120 at a pivot end 145. When in the access position, at least part of the crank arm 140 extends along the axis of rotation AR outwardly from the cable spool 120. When in the collapsed position, the crank arm 140 is pivoted about the pivot ball 145 to lay against the flange 122 (see FIG. 4).

Figure 5:
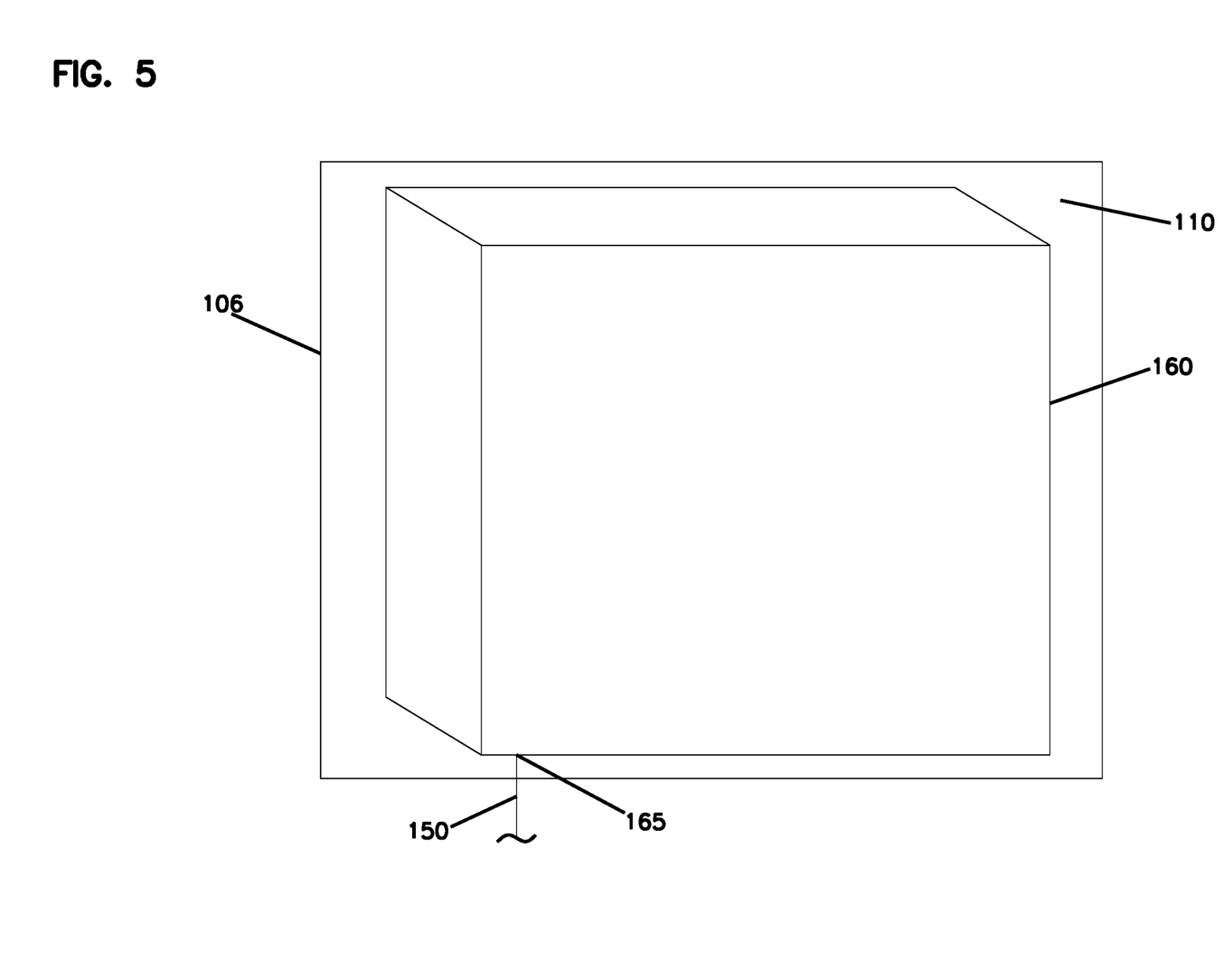
FIG. 5 is a schematic view of the optical cable slack storage system of the above figures with a housing mounted over the cable spool.

In some implementations, the optical cable slack storage system 106 is configured for outside use. For example, FIG. 5 illustrates a housing 160 coupled to the mounting panel 110 to cover the cable spool 120. The housing 160 is configured to cooperate with the mounting panel 110 to environmentally seal an interior of the housing 160. The housing 160 also defines a port 165 through which the optical cable 150 extends to exit the housing 160.

In some implementations, the housing 160 is sufficiently deep to cover the cable spool 120 while the crank arm 140 is disposed in the collapsed position, but not when the crank arm 140 is disposed in the access position. In other implementations, the housing 160 is sufficiently deep to cover the cable spool 120 when the crank arm 140 is detached from the cable spool 120, but not when the crank arm 140 is attached to the cable spool 120.

In use, a user routes an optical cable 150 (e.g., one or more optical fibers optionally surrounded by a jacket) to the cable spool 120. The free end 155 of the optical cable 150 is at least partially wrapped around the cable spool 120 and positioned at the connector holder 130. For example, the free end 155 can be routed through the notch 125 defined by the cable spool 120. In an example, positioning the free end 155 at the connector holder 130 includes plugging the free end 155 into a first port 131 of an optical adapter acting as the connector holder 130.

In some implementations, the crank arm 140 is removed from the mounting location 115 on the mounting panel 110 and attached to the cable spool 120. In other implementations, the crank arm 140 is moved (e.g., pivoted) from a collapsed position to an access position. The user turns the crank arm 140 to rotate the cable spool 120, thereby winding the optical cable 150.

Figure 4:
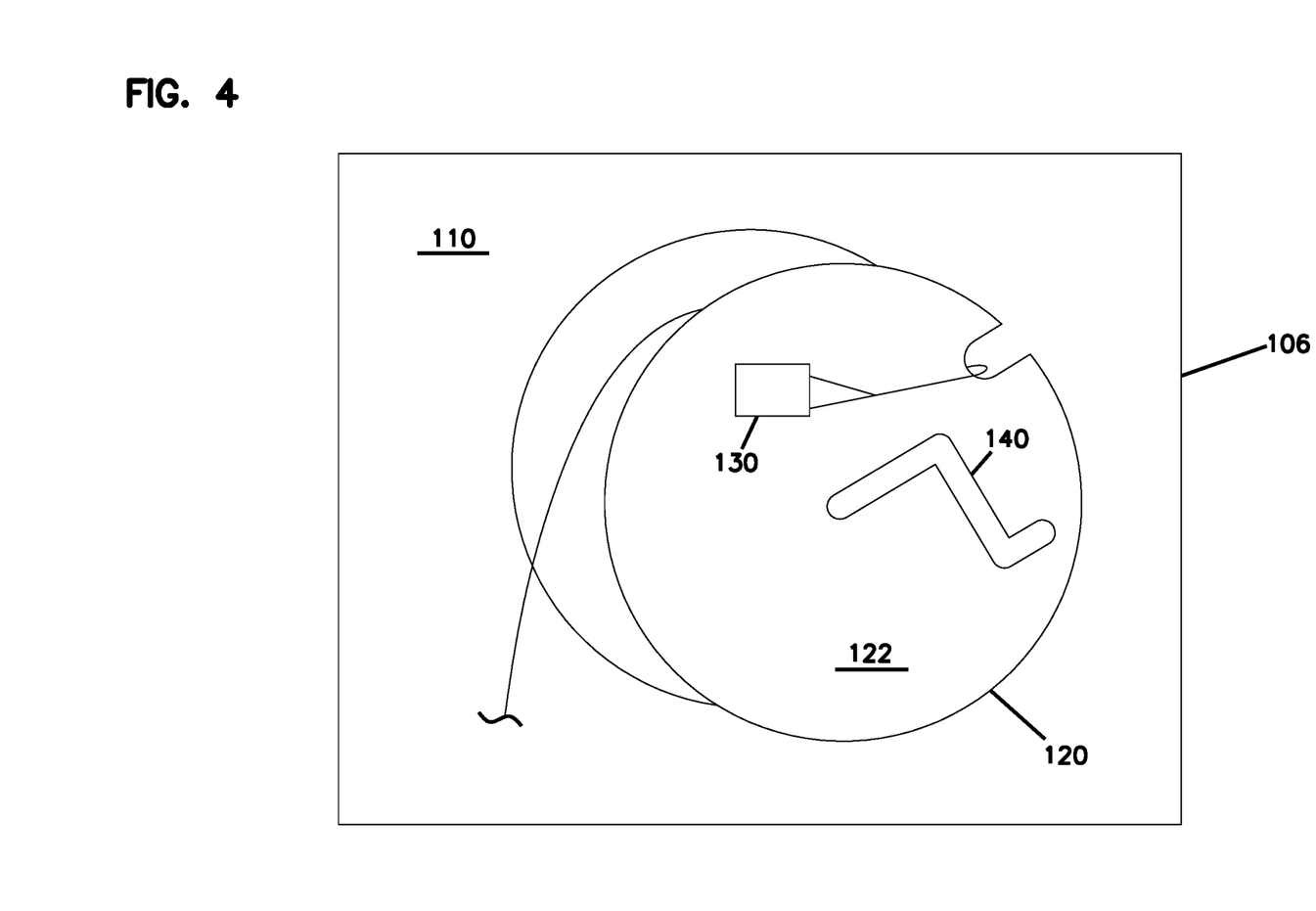
FIG. 4 is a schematic view showing the optical cable slack storage system of FIG. 3 with a crank arm disposed in a collapsed position.

When the optical cable 150 has been wound on the cable spool 120, the user may choose to reduce the volume of the optical cable slack storage system 106. For example, in some implementations, the user may remove the crank arm 140 from the cable spool 120. In some examples, the user may position the crank arm 140 at the mounting location 115 on the mounting panel 110. In other examples, the user may take the crank arm 140 away for use at the next optical cable slack storage system 106. In other implementations, the user may move the crank arm 140 relative to the cable spool 120 to the collapsed position. In an example, the crank arm 140 pivots to the collapsed position. In another example, the crank arm 140 telescopically retracts relative to the cable spool 120.

In some implementations, the user can lock the cable spool 120 relative to the mounting panel 110 in a rotational position. Locking the cable spool 120 inhibits unwinding of the optical cable. In certain examples, the cable spool 120 can be unlocked to enable further rotation of the cable spool 120 relative to the mounting panel 110. In other examples, the user could clamp the cable via a capstan process.

In some implementations, the user can environmentally seal the second end 155 of the optical cable 150 by positioning a housing 160 over the second end 155. In some implementations, the housing 160 attaches to the cable spool 120 and extends over the connector holder 130. In other implementations, the housing 160 attaches to the mounting panel 110 and extends over the connector holder 130 and cable spool 120 (see FIG. 5). In certain examples, the housing 160 defines a port through which the optical cable 150 extends. In certain examples, the housing 160 defines a guide that provides bend radius protection to the optical cable 150 as the optical cable 150 extends into the housing 160.

In some implementations, the optical cable slack storage system 106 can be used to store excess length of a drop cable 150 routed to a subscriber premises 105 from a drop terminal 104. For example, the first end of the optical drop cable 150 can be optically coupled to the drop terminal 104 (e.g., plugged into a port of the drop terminal). The second end 155 of the drop cable 150 can be routed to the subscriber premises and wound on the cable spool 120 using the crank arm 149.

In some examples, the second end 155 of the drop cable 150 can be detached from the connector holder 130 and plugged into a network interface device (NID) or other such equipment at the subscriber premises when service is desired. In other examples, a first end of a patch cord can be plugged into the second port 132 of the optical adapter 130 to optically couple to the drop cable 150. A second end of the patch cord can be routed to the NID to optically couple the NID to the drop cable 150, thereby optically coupling the subscriber to the drop terminal 104.

In other implementations, the optical cable slack storage system 106 can be used to store excess length of an optical fiber or cable within a building (e.g., a subscriber premises 105, a central office 101, etc.).

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A method of installing an optical cable at an installation location, the optical cable having a first end coupled to a network location remote from the installation location, the method comprising:
    routing a second end of the optical cable towards the installation location while the first end is connected to the network location and before storing any portion of the optical cable on a cable spool;
    attaching the second end of the optical cable to a connector holder coupled to the cable spool to rotate in unison with the cable spool while the cable spool is disposed at the installation location, the cable spool including a drum extending axially outwardly from a mounting plate and a first flange extending radially outwardly from the drum at an opposite end of the drum from the mounting plate, the first flange having a first surface facing towards the mounting plate and a second surface facing away from the mounting plate; and
    rotating the cable spool to wind slack length of the optical cable around the drum of the cable spool, the second end of the optical cable rotating in unison with the cable spool.

2. The method of claim 1, wherein the network location includes a drop terminal and the installation location includes a subscriber premises.

3. The method of claim 1, further comprising:
    attaching a crank arm to the cable spool; and
    using the crank arm to rotate the cable spool to wind the slack length.

4. The method of claim 3, further comprising detaching the crank arm from the mounting plate prior to attaching the crank arm to the cable spool.

5. The method of claim 3, wherein attaching the crank arm to the cable spool includes attaching the crank arm to the drum.

6. The method of claim 3, wherein attaching the crank arm to the cable spool includes attaching the crank arm to the first flange.

7. The method of claim 1, wherein rotating the cable spool including turning a crank arm.

8. The method of claim 7, further comprising moving the crank arm from a collapsed position to an access position prior to turning the crank arm, wherein moving the crank arm does not include detaching the crank arm from the cable spool.

9. The method of claim 8, wherein moving the crank arm includes pivoting the crank arm relative to the cable spool.

10. The method of claim 1, wherein the connector holder is disposed at the second surface of the first flange of the cable spool.

11. The method of claim 10, wherein attaching the second end of the optical cable to the connector holder comprises routing a portion of the optical cable from the drum, through a notch defined in the first flange, to the connector holder.

12. The method of claim 11, wherein the notch aligns with the connector holder.

13. The method of claim 11, wherein the notch is sufficiently deep to enable a diameter of the portion of the optical cable routed through the notch to be fully contained within an outer diameter of the first flange.

14. The method of claim 1, wherein the connector holder defines at least a first port, and wherein attaching the second end of the optical cable to the connector holder includes plugging the second end of the optical cable into the first port.

15. The method of claim 14, further comprising:
    unplugging the second end of the optical cable from the first port;
    unwinding a length of the second end of the optical cable from the cable spool;
    routing the unwound length toward subscriber equipment; and
    plugging the second end of the optical cable into the subscriber equipment.

16. The method of claim 14, wherein the connector holder includes an optical adapter defining the first port and also defining an oppositely disposed second port.

17. The method of claim 14, further comprising:
    plugging a connectorized end of a patch cable into the second port; and
    routing another end of the patch cable to subscriber equipment.

18. The method of claim 17, wherein the subscriber equipment is a network interface device (NID).

19. The method of claim 1, further comprising covering the cable spool by mounting a housing to the mounting plate over the cable spool after the optical cable has been wound onto the cable spool, the housing defining a port through which the optical cable exits an interior of the housing.

20. The method of claim 1, further comprising locking the cable spool in one rotational position when the slack length of the optical cable has been wound.

* * * * *